United States Patent

Martinelli et al.

[11] Patent Number: 6,141,042
[45] Date of Patent: Oct. 31, 2000

[54] METHOD AND APPARATUS FOR MEASURING QUALITY OF A VIDEO TRANSMISSION

[75] Inventors: René Martinelli, Eybens; Pierre-Francois Maistre, Chabeuil; Gregory Mathes, St Nizier du Moucherotte, all of France

[73] Assignee: Hewlett-Packard Company, Fort Collins, Colo.

[21] Appl. No.: 09/102,455

[22] Filed: Jun. 22, 1998

[30] Foreign Application Priority Data

Jun. 23, 1997 [EP] European Pat. Off. ............. 97410065

[51] Int. Cl.⁷ .................................................. H04N 17/00
[52] U.S. Cl. ........................................... 348/181; 348/192
[58] Field of Search ........................ 358/139, 10; 348/1, 348/2, 3, 4, 180–184, 192, 193; H04N 17/00, 17/02

[56] References Cited

U.S. PATENT DOCUMENTS

| | | |
|---|---|---|
| 3,008,000 | 11/1961 | Morchand . |
| 3,848,082 | 11/1974 | Summers . |
| 4,025,851 | 5/1977 | Haselwood et al. . |
| 5,038,210 | 8/1991 | Deckelmann et al. ................... 348/182 |
| 5,313,280 | 5/1994 | Straus ..................................... 348/181 |
| 5,450,134 | 9/1995 | Legate .................................... 348/467 |
| 5,574,500 | 11/1996 | Hamada et al. ......................... 348/180 |
| 5,646,675 | 7/1997 | Copriviza et al. ........................... 348/1 |
| 5,666,152 | 9/1997 | Stoker ..................................... 348/180 |
| 5,748,229 | 5/1998 | Stoker ..................................... 348/180 |
| 5,767,893 | 6/1998 | Chen et al. .................................. 348/1 |

FOREIGN PATENT DOCUMENTS

| | | |
|---|---|---|
| 0639833 | 4/1962 | Canada ................................... 358/139 |
| 0539200A2 | 10/1992 | European Pat. Off. . |
| 0746168A1 | 12/1996 | European Pat. Off. . |
| 0746169A1 | 12/1996 | European Pat. Off. . |
| 0789497A2 | 8/1997 | European Pat. Off. . |
| 4417304C1 | 2/1995 | Germany . |

OTHER PUBLICATIONS

EPO Search Report for EP97410065.

*Primary Examiner*—David E. Harvey

[57] ABSTRACT

To facilitate the measurement of the quality of a video transmission, a bar code is embedded in the top part of the frames of the transmitted video signal to enable identification of each frame. The audio signal may be synchronised with the different bar codes. The bar code may be formed of several blocks in the top of the image, and may be formed of superimposed binary bar codes, each binary bar code being in one color of a color system. This permits measurement of transmission quality, and notably of dropped frames, audio holes, transmission delay, audio and video synchronisation.

15 Claims, 3 Drawing Sheets

FIG. 3b
(RED)
FIG. 3c
(GREEN)
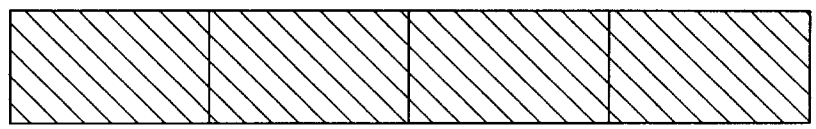
FIG. 3d
(BLUE)
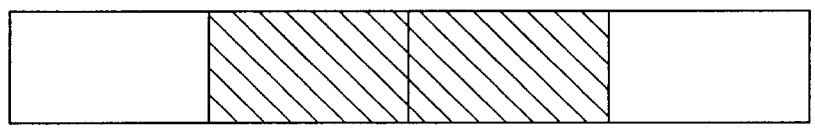
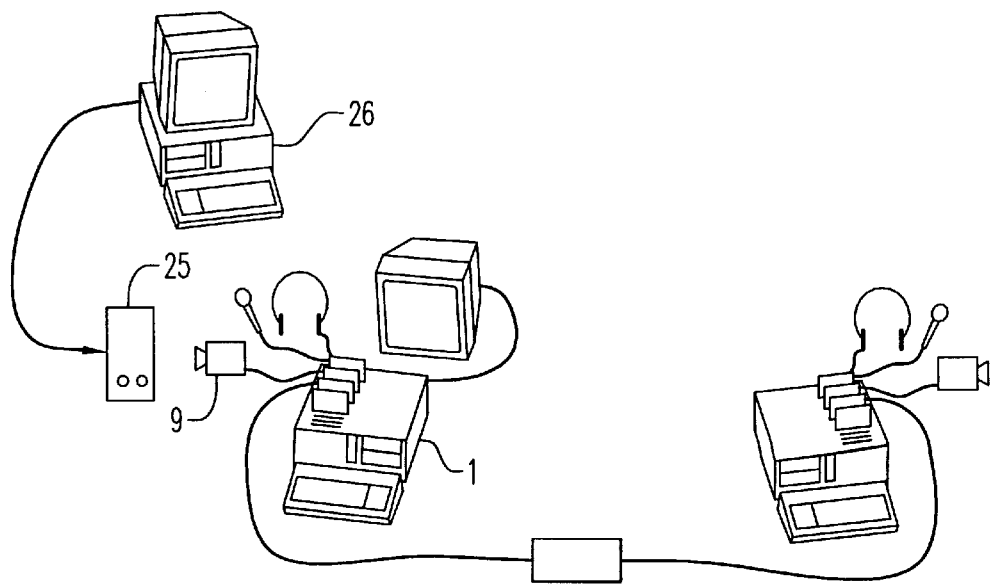
FIG. 4

METHOD AND APPARATUS FOR MEASURING QUALITY OF A VIDEO TRANSMISSION

FIELD OF THE INVENTION

The present invention relates to the measurement of video transmission quality. It especially applies to measurement of the quality of videoconference systems.

BACKGROUND OF THE INVENTION

Nowadays, more and more systems are transmitting video data, using different types of transmission media. Inter alia, many videoconference systems are being put on the market. The simplest of these systems are designed for use between personal computers (PC) connected to a local area network (LAN). All these systems have very different features, quality, and of course prices. There is no easy way objectively to compare these different systems.

FIG. 1 is a schematic view of the basic structure of a videoconference system, in which the invention may be implemented. The videoconference system of FIG. 1 comprises two PCs 1 and 2, linked through a LAN 3; each PC is provided with a microphone 5, 6, a headset 7, 8 and a camera 9, 10, and a display 11, 12. The video image and audio information is transmitted from one PC to the other, so as to permit video conferencing between the PC users.

The following problems are still encountered in new video transmission systems such as videoconference systems:

- the image is not as fluid as in TV programs; all movements do not appear on the screen, and some images are lost;
- during communication, there are some interruptions, or 'holes' in the sound;
- the audio and image streams are not always synchronised, so that lips movements do not exactly correspond to the words heard;
- there are transmission delays, and it may sometimes be necessary to wait until a correspondent has listened to a previous utterance before being able to speak.

These problems may be associated with the following parameters of the video transmission system:

- image frame rate;
- number of lost frames;
- number and duration of audio interruptions, that is of so-called audio 'holes';
- image and sound synchronisation;
- transmission delay.

SUMMARY OF THE INVENTION

Accordingly, the purpose of the invention is to solve the new problem of providing an objective means for comparing the transfer characteristics of video transmission systems. Another purpose of the invention is to provide a method and apparatus for carrying out quality measurements on the transfer of transmissions of a video transmission system operating between PCs, and in particular, but not exclusively, of a LAN videoconferencing system.

The invention provides a solution for effecting quality measurements that is independent of the video transmission system to be assessed, and that does not disturb the normal operation of the assessed system. The solution of the invention provides a precise and reliable measurement.

According to one aspect of the present invention there is provided a method of measuring the quality of transfer between a source and a destination of a transmission comprising a video signal defining plural video frames, the method comprising the steps of:

(a) providing a reference code in at least some of the video frames of the transmission transmitted from the source, the reference code taking the form of a predetermined pattern of areas in the image represented by the video signal with each said area being capable of assuming any one of a respective plurality of color states, each combination of color states assumed by the areas constituting a code value for the reference code;

(b) causing the reference code provided in the transmitted video frames to evolve over time through a predetermined sequence of code values;

(c) receiving the transmission at the destination, detecting the reference code in the received video frames and determining the code values of the reference code; and (d) carrying out quality measurements on the coherence of transmission as received at said destination using the codes values of the detected reference codes as a reference indicative of the transmission as sent from the source.

By coherence of the transmission is meant whether all parts of the transmission are present and in the proper time relation.

Preferably, the reference code is provided in the same position in the image represented by each video frame in which the reference code is provided; it would alternatively be possible to use a pattern recognition technique at the destination to locate the position of the reference code in the received frames.

In one embodiment, step (a) involves modifying an input video signal at the source by insertion of signals representing the reference code, and step (b) involves changing the inserted signals over time. In another embodiment, step (a) involves using a digital camera to image a plurality of light sources arranged in said predetermined pattern, and step (b) involves controlling the energisation of these light sources. In this latter embodiment, each light source is preferably selectively controlled to be one of ON and OFF according to the current code value required, and the rate of switching of each light source is preferably less than the rate of change of code values.

Advantageously, the evolution of the predetermined sequence of code values is synchronised with the video frame rate of the transmission. In this case, the reference code may be provided in all or only some of said video frames with the code value of the reference code being different between adjacent occurrences of the reference code in the video frames.

Preferably, for simplicity the reference code is a bar code made up of a linear array of blocks constituting said areas.

Each area of the reference-code pattern may be arranged to take on only two color states, one of which is a black, unilluminated or OFF state. Alternatively, each area can be arranged to take on any one of $2^K$ color states depending on the presence or absence of each of k basic colors of a color system used by the transmission (for example an RGB system). In this case, determining the code value in step (c) involves determining the color state of each area by monitoring the basic-color signals derived from the received transmission.

Where the reference code is provided in each frame with the code value of the reference code serving to identify that frame, step (d) may involving using the code values of the received frames to determine the number of frames transmitted but not received. Where the reference code is provided only in every nth frame with the code value of the reference code serving to identify that frame, step (d) may involve determining the number of frames between those provided with reference code.

The transmission of interest may include an audio signal and in this case, step (d) advantageously involves carrying out quality measurements in respect of the audio signal. For example, step (d) may involve measuring the time delay between the reception of the audio signal and the reception of a frame with which it was synchronised at the source. Where the audio signal is a continuous audio signal, step (d) may involve measuring the frequency and length of any time period where no audio signal is received at said destination.

According to another aspect of the present invention, there is provided a measurement tool for measuring the quality of transfer between a source and a destination of a transmission comprising a video signal defining plural video frames at least some of which include a reference code taking the form of a predetermined pattern of areas in the image represented by the video signal, each said area assuming a respective plurality of color states with each combination of color states assumed by the areas constituting a code value for the reference code, the reference code as present in the transmission at the source changing its code value according to a predetermined sequence; the measurement tool comprising:

means for receiving the transmission at the destination;

means for detecting the reference code in the video frames received at the destination and determining the code values of the reference code; and means for carrying out quality measurements on the coherence of the transmission received at the destination using the codes values of the detected reference codes as a reference indicative of the transmission as sent from said source.

BRIEF DESCRIPTION OF THE DRAWINGS

A method and an apparatus embodying the invention will now be described, by way of non-limiting example, with reference to the accompanying drawings, in which:

FIG. 4 is a schematic view of the structure of a video conference system using a bar code according to a second embodiment of the invention.

BEST MODE OF CARRYING OUT THE INVENTION

The invention uses a bar-code in a video image to identify the different frames of the image signal; this permits measurement of the image frame rate and of the number of lost frames. It also allows measurement of the synchronisation between the audio and image signals, and detection of audio 'holes'.

Figure 2:
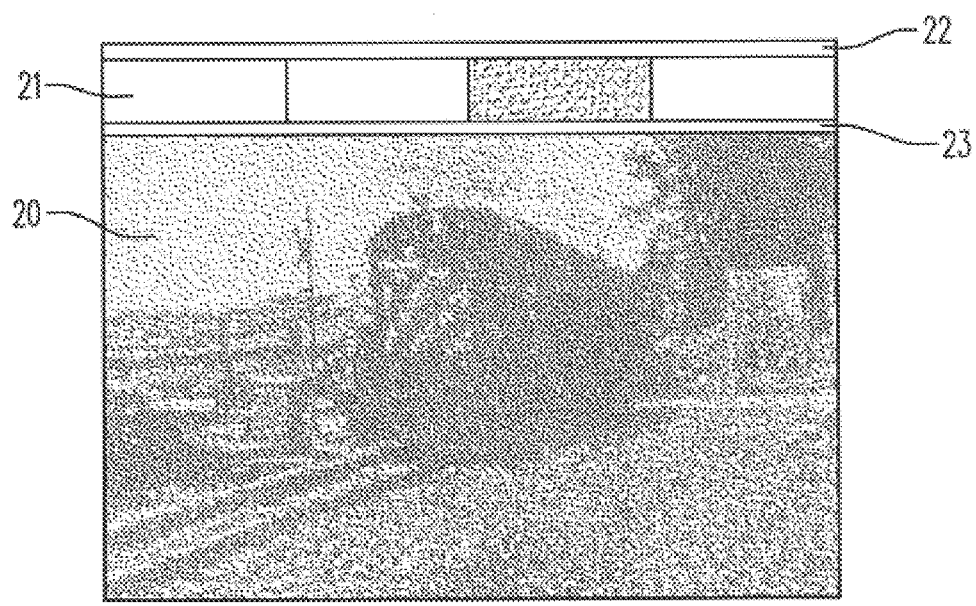
FIG. 2 is an exemplary frame showing a bar code according to a first embodiment of the invention.

FIG. 2 is an exemplary frame showing a bar code according to a first embodiment of the invention. The frame of FIG. 2 is comprised of a background image 20, into which a bar code 21 is inset. In the embodiment of FIG. 2, the bar code is comprised of four blocks forming a horizontal bar code located at the top of the frame. This structure of the bar code withstands most existing compression/decompression sequences, and notably those based on spatial compression methods. The size of the blocks may be optimised to withstand compression and decompression; a block of 192 pixels width and 68 pixels height is appropriate. The bar code thus has a height of 68 pixels, and a width of 768 pixels, that corresponds to the width of a standard video frame. The bar code is inset into the picture of a frame.

It is also possible to add above and under the bar code a compression buffer 22 and 23, such as a horizontal bar of a given colour; this makes the degradation to the bar code independent of the background image. In the embodiment of FIG. 2, each compression buffer comprises a light grey bar of 11×768 pixels.

The bar code of FIG. 2 may be used to identify a given video frame, as discussed below. If this bar code is a black and white bar code, it allows identification of eight different frames, for a four block bar code. As discussed below, this may be sufficient for several types of measurements.

Figure 3A:
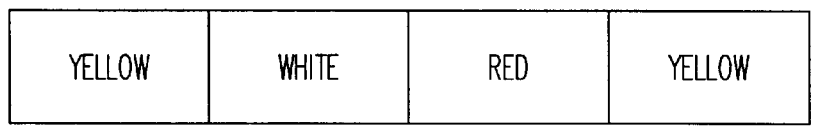
FIG. 3 is an example of a colour bar code.

FIG. 3 is an example of a colour bar code. In the embodiment of FIG. 3, the bar code is formed of superimposed binary bar codes, each binary bar code being in one colour of a colour system, such as the RGB system used in most PCs. In this respect, the invention takes advantage of the definition of a colour as an addition of the three components of a colour system, and proposes to use binary values for the three components in order to define a colour bar code. FIG. 3a shows a four block bar code, that is comprised of yellow, white, red and yellow blocks, as it would be seen by the user of the invention. FIGS. 3b, 3c, and 3d shows the three binary R, G and B bar codes which form the colour bar code of FIG. 3a. The binary red bar code of FIG. 3b comprises four red blocks, and codes a binary 1111. The binary green bar code of FIG. 3c comprises two green blocks, a white block, and one green block, and codes a binary 1101. The binary blue bar code of FIG. 3d comprises one white block, one blue block, and two white blocks and codes a binary 0100. The term "white" in the description of FIGS. 3b, 3c and 3d means that the colour component is not present in a given block.

This embodiment of the invention makes it possible to increase the number of possible values of the bar code. It is clear that the number of possible values of the bar code of FIG. 3 is 2^12, thus 4096. This allows identification of individual frames during more than 163 seconds at 25 frames per second. The bar code could use a non-binary coding in order to further increase the number of values. However, the binary coding of FIG. 3 has proved to provide the more robust coding, and the easiest detection scheme. The person skilled in the art of video will know how to generate and inset into a video frame a bar code such as the one of FIG. 3. It is possible to use a bitmap format for generating the different possible bar codes; each of these would then be inset into a given frame.

The bar code of FIGS. 2 and 3 is easy to use and appropriate for analog video, where standard format make it easy to inset a bar code into a video frame. It is also possible to use such a bar code in a digital video transmission system, inasmuch as it is possible to inset the bar code into a frame. The invention also proposes a solution that may be used in any video transmission system; the invention proposes to use a bar code comprised of the image of a plurality of lights, preferably LEDs. FIG. 4 is a schematic view of the structure of a video conference system using such a bar code. In the embodiment of FIG. 4, a board of lights is filmed in the image, and temporally marks the image.

Figure 1:
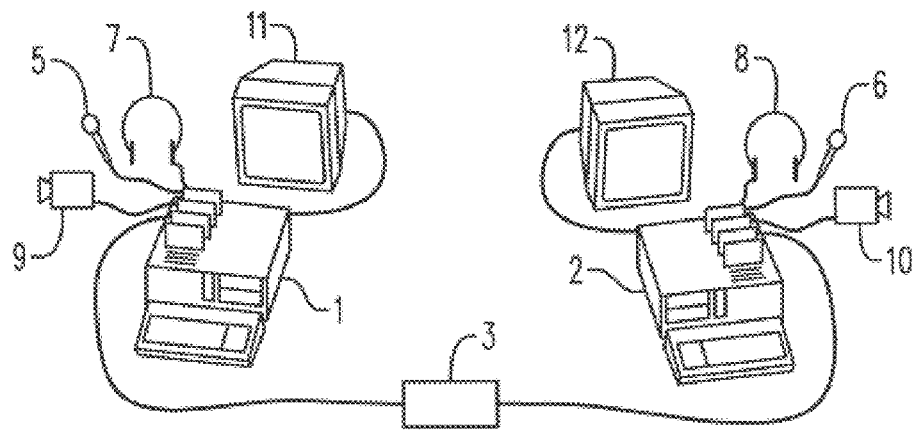
FIG. 1 is a schematic view of the basic structure of a videoconference system.

The video conference system of FIG. 4 is similar to the one of FIG. 1. It further comprises a board of lights 25 that is filmed by the camera 9 of the PC 1; this board is comprised of a number of light sources, e.g. four light sources, and is driven by a PC 26. The driving PC 26 changes the on/off state of the different light sources of the board 25, so as to vary the bar code in the image filmed. This will temporally mark the filmed image and therefore the transmitted video image, though not necessarily in each frame, or with a code different for each frame (that is, code changes are not necessarily synchronised with frame transitions); however, as explained below, it provides the timing information necessary for assessing the quality of the video transmission.

The camera 9 will often be a digital CCD camera. Such cameras integrate the luminence they receive during an acquisition period (frame duration) following which there is a period when the viewed scene is ignored (the light sensitive MOS transistor is grounded). In order to ensure that the camera does not 'see' each light as a continuous light, the light sources of the board 25 will preferably blink slowly, while the state of the bar code varies more rapidly. A solution for this is to use a sequence of switching of the lights in which the switching of each light is temporally offset with respect to the switching of the adjacent light. Such a sequence is given in the following table, in the case the board 25 comprises 4 light sources. In this case, the bar code has $2^4=8$ different states, and may vary at a speed of 25 states per second, whereas each light only varies at a speed around 6 states per second

| Bar Code Frame | Lights State |
| --- | --- |
| 1 | 0000 |
| 2 | 0001 |
| 3 | 0011 |
| 4 | 0111 |
| 5 | 1111 |
| 6 | 1110 |
| 7 | 1100 |
| 8 | 1000 |

In the foregoing code, only the ON and OFF state of each light is taken into account and not the color of each light; the reason for this is that where the camera 9 is a CCD camera, the lights when ON more or less "dazzle" the CCD captor making it difficult to reliably detect the light color. However, with suitable camera technology it would be possible to account of light color in the bar code.

An advantage of the FIG. 4 arrangement is that the bar code can be placed in the transmitted video signal without knowledge of the specific and often proprietary protocol operated by the camera.

Figure 5:
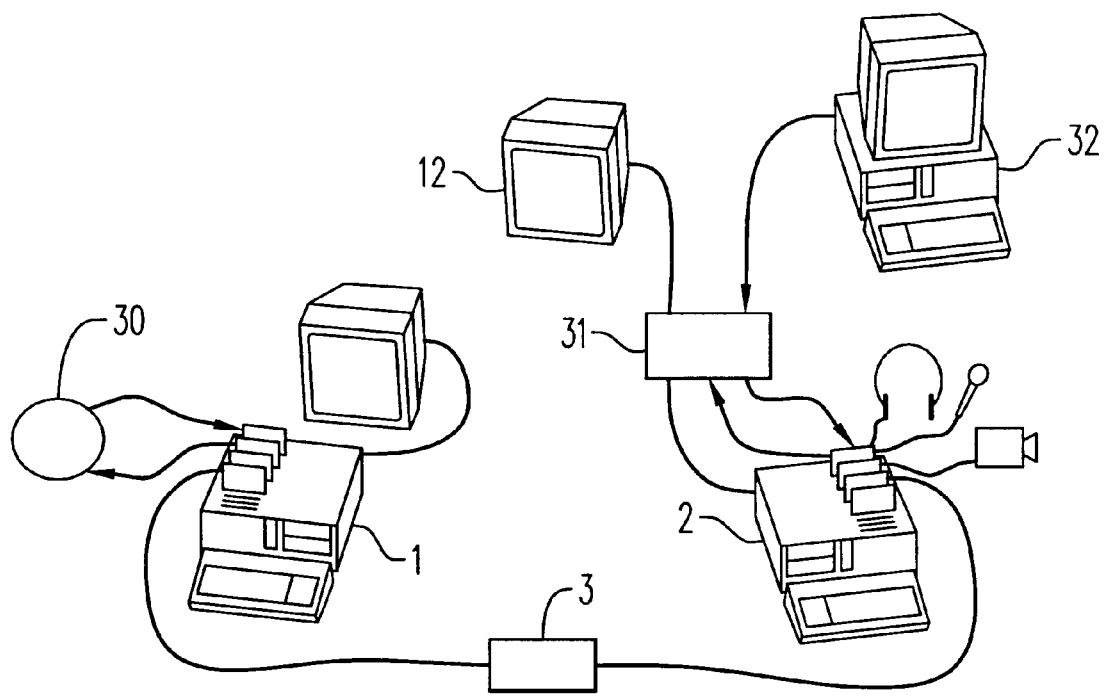
FIG. 5 is a schematic view of the structure of a video conference system, showing a measurement tool.

FIG. 5 is a schematic view of the structure of a video conference system with an associated measurement tool utilising the bar codes embedded in the video image. The structure of FIG. 5 is similar to the one of FIG. 1; the PC 1 transmits over the LAN a video signal having a bar code according to the invention, such as the bar code of FIGS. 2 and 3, or the bar code of FIG. 4. This may simply be done as shown on FIG. 5, by plugging the video and audio signals output by a VCR 30 into a suitable video input and an audio input of the PC 1. The VCR 30 may run a test movie for carrying out measurements. Alternatively, one could use the board described in reference to FIG. 4.

The measurement tool analyses the display signals of the receiver of the video transmission system in order to locate and decode the bar code transmitted in the video signal. This solution makes the operation of the measurement tool independent of the videoconference application. It will not disturb the normal operation of the assessed system, since it simply spies on the display signals. This approach also has the advantage of being simple to realise, since the format of the display signals is usually a standard, and is easy to analyse.

The measurement tool also analyses the audio signals in order to perform a range of measurements. For this, it is possible to use the audio input and output ports usually provided in the receiver of the video transmission system; the audio signal output by the receiver is analysed in order to determine whether an audio signal is present or not.

In the system of FIG. 5, the measurement tool is formed by an audio-video board 31 linked with a driving PC 32. This AV board 31 is connected, on one hand between the PC 2 and its display 12, so as to receive and derive part of the display signals, e.g. VGA signals sent from the PC to the display. On the other hand, the AV board 31 also receives the audio signal output from the "line out" port of the PC 2; this audio signal is then returned to the "line in" port of the PC 2, after part of it is derived for determining the presence of an audio signal.

The measurement tool comprises means for detecting the bar code, and means for detecting the audio signals. The means for detecting the bar code uses the vertical and horizontal synchronisation signals to select the video lines where the bar code should be sampled. Preferably, the position of the bar code in the frame may be set by using an analog delay, programmable from the driving PC 32. The bar code is then sampled, in accordance with the number of blocks of the bar code. In case a colour bar code is used, the colour components of the display signals, e.g. the R, G and B components are sampled independently. The result is output and sent to the driving PC 32. The means for detecting the audio signals determine whether an audio signal is present or not at a given time; the result is output and sent to the driving PC 32. The results output by the means for detecting the bar code, and by the means for detecting the audio signals are stored in the driving PC 32.

The measurement of the different parameters listed above may be carried out as follows.

Measurement of the Image Frame Rate

The image frame rate may be measured by simply computing the number of frames received in a given time period.

Measurement of the Dropped Frames

Measurement of dropped frames may be carried out by sending a video signal in which each frame is marked with a different bar code, following a given sequence. In the case of the colour bar code of FIG. 3, the different bar codes may be simply numbered using the formula:

frame_number=256*Blue_binary_code+16*Green_binary_code+Red_binary_code

Each frame in the transmitted video sequence is then marked, and the bar code numbers of the received frames are decoded and stored. The calculation of the number of dropped frames is straightforward.

Image and Sound Synchronisation

Measurement of image and sound synchronisation may be carried out by sending a video signal in which the audio signal starts at a given frame. The measurement tool may then determine the time period between the reception of the given frame and the audio signal, and determine which signal arrived first. This measures the difference in transmission time between audio and video streams, and also reflects the shift that might result from the use of different compression/decompression algorithms for the video and audio signals.

In case one uses the colour bar code of FIG. 3, one simple embodiment may be to have a video sequence without any sound, with a given frame marker, e.g. with no blue in the third square. Then, sound is sent, simultaneously with another frame marker, e.g. blue in the third square.

Transmission Delay

Measurement of the transmission delay may be carried out by sending an audio signal from the measurement tool, and by measuring the time needed for the transmission of this signal up and down the transmission medium. The transmission delay is equal to half of that time. For this measurement, the system of FIG. 5 is adapted by simply plugging a conductor between the line in and line out ports of the PC 1.

Audio Holes

Measurement of audio holes may be carried out by sending a video signal with a continuous audio signal. It is then sufficient to measure the frequency and length of the time periods during which no audio signal is received.

All these measurement may be carried out for different types of video sequences, such as low frame rate film, average frame rate film, high frame rate film, very high frame rate film, "Hollywood" film, or "talking heads" film. The capacity of the video transmission system for all these types of video sequences may thus be determined.

It is also possible to proceed with a continuous measurement of all parameters, simply by preparing a movie adapted for the different measurements. The movie would then comprise delimiters, that is frames having a given bar code to indicate the beginning or the end of a given measurement or of a given type of movie sequence. It is also advantageous to provide a calibration sequence for adjusting the measurement tools, and notably the exact position of the bar code.

It should be understood that the invention is not limited to the preferred embodiments described above. The bar code could be inset not into every frame, but into the odd or even frames, if this proves useful. The bar code could be inserted in only some of the frames, e.g. at a given interval, in order to measure an average number of dropped frames.

The measurements are not limited to those listed above, and other information could also be measured. The bar code information may be integrated, and not only sampled, especially if non-binary values are used for the coding.

It will be appreciated that the bar code serves as a reference code marking the orginal transmission, for example frame by frame. This reference code is not limited to a four block bar code, or to a board of four light sources, as described above: it could comprise 16 or 20 blocks, that may be arranged along more than one line. In fact, the reference code can take the form of any predetermined pattern of areas in the image represented by the video signal with each area being capable of assuming any one of a respective plurality of color states (including OFF or black). Each combination of color states assumed by these areas can be considered as constituting a code value for the reference code. The reference code has its code value changed through a predetermined sequence of values and the changes in code value may or may not be synchronised with the video frame transitions.

Although in the described examples, the transmission under consideration is one passing across a LAN, it will be appreciated that the present invention can also be used for making measurements in relation to the transfer of the transmission over other paths such as from a camera direct to a receiving system, or from a camera, onto video cassette, and subsequently from the cassette to a receiving system (this being considered as a transfer path even though the transfer process is not in this case continuous from camera to receiving system).

What is claimed is:

1. A method of measuring transfer quality between a source and a destination of a transmission comprising a video signal defining plural video frames, said method comprising:

providing a code in video frames of the transmission by using a camera to image a plurality of light sources arranged in a predetermined pattern so that said code takes the form of a pattern of areas in the image with each said area assuming one of a plurality of colors, each combination of colors constituting a code value;

causing said code to evolve over time through a predetermined sequence by controlling said light sources;

detecting said code in the received video frames and determining the code values; and measuring the coherence of said transmission using the detected code values as a reference indicative of the transmission as sent from said source.

2. A method according to claim 1, wherein each said light source is selectively controlled to be one of ON and OFF according to the current code value required.

3. A method according to claim 2, wherein the rate of switching of each light source is less than the rate of change of code values.

4. A method of measuring transfer quality between a source and a destination of a transmission comprising a video signal defining plural video frames, the signal being digitally compressed and decompressed along the transmission path, the method comprising:

(a) providing a code in video frames of the transmission transmitted from said source, said code taking the form of an array of blocks extending across the width of said image, each block being sized to withstand the compression and decompression of the signal, with each block assuming one of a plurality of colors, each combination of colors constituting a code value;

(b) causing said code provided in the transmitted video frames to evolve over time through a predetermined sequence;

(c) detecting said code in the received video frames and determining the code values; and (d) measuring the coherence of the received transmission using the values of the detected codes as a reference indicative of the transmission as sent from said source.

5. A method according to claim 4, wherein the evolution of said sequence of code values is synchronized with the video frame rate of said transmission.

6. A method according to claim 4, wherein said code is provided only every nth frame where n is an integer greater than unity, the code value of said code being different between adjacent occurrences of said code in said video frames.

7. A method according to claim 4, wherein said code is provided in every video frame of said transmission, the code value of said code being different between adjacent video frames.

8. A method according to claim 4, wherein said code is made up of a linear array of blocks constituting said areas, each block being at least twice as wide as it is high.

9. A method according to claim 4, wherein said code values change at a rate greater than 15 times a second.

10. A method of measuring transfer quality between a source and a destination of a transmission comprising a video signal defining plural video frames and using the RGB color system, the method comprising:

(a) providing a code in video frames of the transmission, said code taking the form of a predetermined pattern of areas in the image with each said area assuming one of 8 colors depending on the presence or absence of each basic color, each combination of colors constituting a code value;

(b) causing said code provided in the transmitted video frames to evolve over time through a predetermined sequence;

(c) detecting said code in received video frames and determining the code values by monitoring the basic-color signals derived from said transmission; and (d) measuring the coherence of said transmission using the code values as a reference indicative of the transmission as sent from said source.

11. A method according to claim 10, wherein said code is provided in each frame with the code value serving to identify that frame, step (d) involving using the code values of the received frames to determine the number of frames transmitted but not received.

12. A method according to claim 10, wherein said code is provided in every nth frame with the code value of the code serving to identify that frame, step (d) involving determining the number of frames between those provided with a code.

13. A method of measuring transfer quality between a source and a destination of a transmission comprising a video signal defining plural video frames and an audio signal, said method comprising:

(a) providing a code in at least some of said video frames of the transmission, said code taking the form of a predetermined pattern of areas in the image represented by the video signal with each said area assuming one of a plurality of colors, each color combination constituting a code value, the audio signal being synchronized with at least one frame provided with a said code;

(b) causing said code provided in the transmitted video frames to evolve over time through a sequence of code values;

(c) detecting said code in the received video frames and determining the code values; and (d) measuring the coherence of said transmission received at said destination using the codes values as a reference by measuring the time delay between the reception of the audio signal and the reception of the frame with which it was synchronized.

14. A method according to claim 13, wherein a continuous audio signal is included in said transmission, step (d) involving measuring the frequency and length of any time period where no audio signal is received at said destination.

15. A measurement tool for measuring transfer quality between a source and a destination of a transmission comprising a video signal defining plural video frames and using the RGB color system, at least some of which are provided with a code taking the form of a predetermined pattern of areas in the image with each said area assuming one of 8 colors depending on the presence or absence of each basic color, each combination of colors constituting a code value, said code provided in the transmitted video frames evolving over time through a predetermined sequence; the measurement tool comprising:

a detector for detecting said code in received video frames and determining the code values by monitoring the basic-color signals derived from said transmission; and circuitry for measuring the coherence of said transmission using the code values as a reference indicative of the transmission as sent from said source.

* * * * *